(12) United States Patent
Huang et al.

(10) Patent No.: US 8,151,221 B2
(45) Date of Patent: Apr. 3, 2012

(54) METHOD TO COMPENSATE OPTICAL PROXIMITY CORRECTION

(75) Inventors: Chun-Hsien Huang, Jiali Township, Tainan County (TW); Ming-Jui Chen, Tainan (TW); Te-Hung Wu, Xinshi Township, Tainan County (TW); Yu-Shiang Yang, Madou Township, Tainan County (TW)

(73) Assignee: United Microelectronics Corp., Hsinchu (TW)

( * ) Notice: Subject to any disclaimer, the term of this patent is extended or adjusted under 35 U.S.C. 154(b) by 149 days.

(21) Appl. No.: 12/769,873

(22) Filed: Apr. 29, 2010

(65) Prior Publication Data

US 2011/0271237 A1 Nov. 3, 2011

(51) Int. Cl.
*G06F 17/50* (2006.01)

(52) U.S. Cl. .......................................... 716/53

(58) Field of Classification Search ............. 716/53
See application file for complete search history.

(56) References Cited

U.S. PATENT DOCUMENTS

2008/0241973 A1* 10/2008 Terahara .................... 438/8
2009/0319970 A1* 12/2009 Park ............................ 716/5

FOREIGN PATENT DOCUMENTS

TW 557492 12 10/2003

OTHER PUBLICATIONS

Author: Todd C. Baileya, et al. Title: Reflectivity-induced Variation in Implant Layer Lithography.; Optical Microlithography XXI, edited by Harry J. Levinson, Mircea V. Dusa, Proc. of SPIE vol. 6924, 69244F, (2008) • 0277-786X/08/$18 • doi: 10.1117/12.773102; Proc of SPIE vol. 6924 69244F-1—69244F-11.

* cited by examiner

Primary Examiner — Suresh Memula
(74) Attorney, Agent, or Firm — Chun-Ming Shih

(57) ABSTRACT

A method to compensate optical proximity correction adapted for a photolithography process is provided. An integrated circuit (IC) layout firstly is provided. The IC layout includes active regions and a shallow trench isolation (STI) region. The STI region is a region except the active regions. The IC layout further includes ion implant regions which are overlapped with a part of the STI region and at least a part of the active regions. Subsequently, at least a photoresist line width compensation region is acquired in a photoresist covering region outside the ion implant regions according to the IC layout. Each photoresist line width compensation region is disposed in the STI region. Afterwards, the IC layout is corrected according to a width of the photoresist line width compensation region, a length of a side of the active region facing a side of the photoresist line width compensation region and a distance from the side of the photoresist line width compensation region to the active region facing the side. Finally, the corrected IC layout is transferred to a photomask.

5 Claims, 4 Drawing Sheets

METHOD TO COMPENSATE OPTICAL PROXIMITY CORRECTION

BACKGROUND

1. Technical Field

The present invention generally relates to optical proximity correction (OPC) and, particularly to a method to compensate optical proximity correction for shallow trench isolation (STI) effect.

2. Description of the Related Art

An integrated circuit (IC) layout generally includes active regions, a shallow trench isolation (STI) region and ion implant regions overlapped with a part of the STI region and a part of the active regions. The STI region is a region except the active regions. Before an ion implanting process is performed to the implant regions, a photolithography process firstly is carried out to form a photoresist pattern on a substrate and whereby the ion implant regions are exposed. However, since different patterns on the substrate would cause light to be influenced resulting from different light reflectivity during exposure, which would result in the photoresist pattern occurring critical dimension variation after developing, i.e., the actual critical dimension of the developed photoresist pattern does not meet target. In order to obtain a proper photoresist pattern after exposure, it is necessary to perform optical proximity correction for photomask.

In particular, before the photoresist pattern is formed, an anti-reflective coating layer is firstly formed on the substrate to avoid the critical dimension variation of the developed photoresist pattern caused by light reflection during exposure. However, since the ion implant regions are needed to be ion implanted in subsequent process, the anti-reflective coating layer could not cover the ion implant regions. Therefore, the incident light would readily be reflected by silicon and oxide films in the ion implant regions during exposure, together with the shallow trench isolation topography influence, which result in the traditional optical proximity correction would not accurately correct the photomask, and the critical dimension variation occurred as a result. The issue of critical dimension variation may cause the edges of the ion implant regions are covered by photoresist or cause photoresist peeling. Herein, the photoresist peeling is a phenomenon of the photoresist being cracked resulting from excessive small line width thereof.

BRIEF SUMMARY

Accordingly, the present invention is directed to a method to compensate optical proximity correction, in order to make the photoresist pattern meet target.

More specifically, a method to compensate optical proximity correction in accordance with an embodiment of the present invention is provided. The method to compensate optical proximity correction includes the following steps. In particular, an integrated circuit layout is provided. The integrated circuit layout includes multiple active regions and a shallow trench isolation region. The shallow trench isolation region is a region except the active regions. The integrated circuit layout further includes multiple ion implant regions overlapped with a part of the shallow trench isolation region and at least a part of the active regions. Subsequently, at least a photoresist line width compensation region is acquired from a photoresist covering region outside the ion implant regions according to the integrated circuit layout, and the photoresist line width compensation region is disposed in the shallow trench isolation region. Afterwards, the integrated circuit layout is corrected according to a width of the photoresist line width compensation region, a length of a side of the active region facing a side of the photoresist line width compensation region, and a distance from the side of the photoresist line width compensation region to the active region facing the side of the photoresist line width compensation region. Then, the corrected integrated circuit layout is transferred to a photomask.

In one embodiment of the present invention, the width of the photoresist line width compensation region is smaller than 500 nanometers (nm).

In one embodiment of the present invention, a width of the ion implant region disposed at the side of the photoresist line width compensation region is larger than 700 nm.

In one embodiment of the present invention, the step of correcting the integrated circuit layout includes the following sub-steps. A proper look-up table firstly is selected from multiple look-up tables according to the length of the side of the active region facing the side of the photoresist line width compensation region. Subsequently, the selected look-up table is inquired according to the width of the photoresist line width compensation region and the distance from the side of the photoresist line width compensation region to the active region facing the side of the photoresist line width compensation region, and thereby a correction value of the photoresist line width compensation region is obtained. Afterwards, the integrated circuit layout is corrected according to the correction value.

In one embodiment of the present invention, the look-up tables include a first look-up table, a second look-up table and a third look-up table. When the length of the side of the active region facing the side of the photoresist line width compensation region is smaller than 300 nm, the first look-up table is selected. When the length of the side of the active region facing the side of the photoresist line width compensation region falls into the range from 300 nm to 600 nm, the second look-up table is selected. When the length of the side of the active region facing the side of the photoresist line width compensation region is larger than 600 nm, the third look-up table is selected.

In summary, since the method to compensate optical proximity correction in accordance with the above-mentioned embodiments of the present invention particularly compensates the line width of the photoresist pattern formed in the shallow trench isolation regions, the issue of photoresist pattern variation caused by shallow trench isolation topography influence can be relieved.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
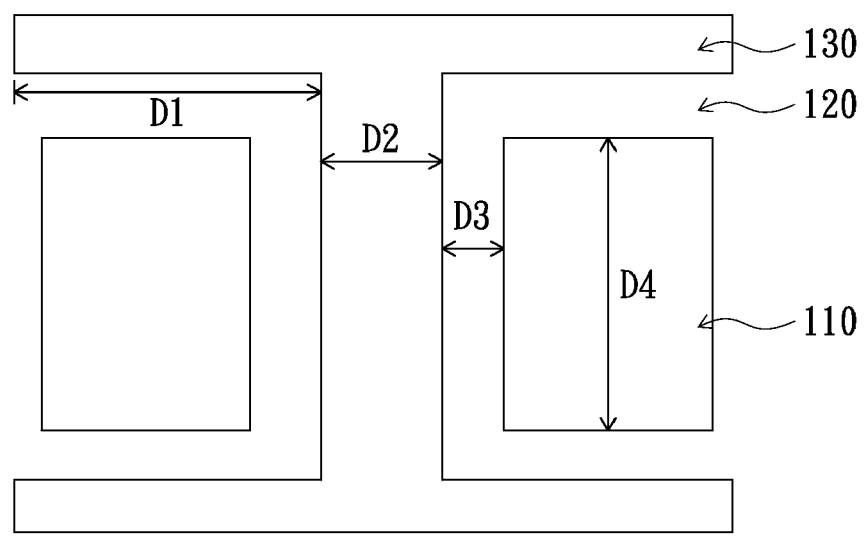
FIG. 1 shows a test layout pattern used in an embodiment of the present invention.

A better understanding of the above and many other features and advantages of the novel method to compensate optical proximity correction of the present invention may be obtained from a consideration of the detailed description of some exemplary embodiments thereof below, particularly if such consideration is made in conjunction with the appended drawings, wherein like reference numerals are used to identify like elements illustrated in one or more of the figures thereof.

FIG. 1 shows a test layout pattern used in an embodiment of the present invention. As illustrated in FIG. 1, the test layout pattern 100 is used for the analysis of shallow trench isolation (STI) topography influence applied to the critical dimension of photoresist pattern. In particular, the test layout pattern 100 includes two active regions 110, two ion implant regions 120 and a region 130 of photoresist pattern for forming an implant layer during ion implantation (hereinafter also referred to as photoresist covering region 130). A shallow trench isolation region is a region except the active regions 110, and thus regions exposed to receive implantation during implanting are the active regions 110 and a part of the shallow trench isolation region. According to the analysis result of experimental data, the critical dimension of the photoresist covering region 130 formed in the STI region 130 would be influenced by a width D1 of each of the ion implant regions 120, a space D2 between the two ion implant regions 120, a distance D3 between the photoresist covering region 130 and each of the active regions 110, and a length D4 of each of the active regions 110.

Figure 2:
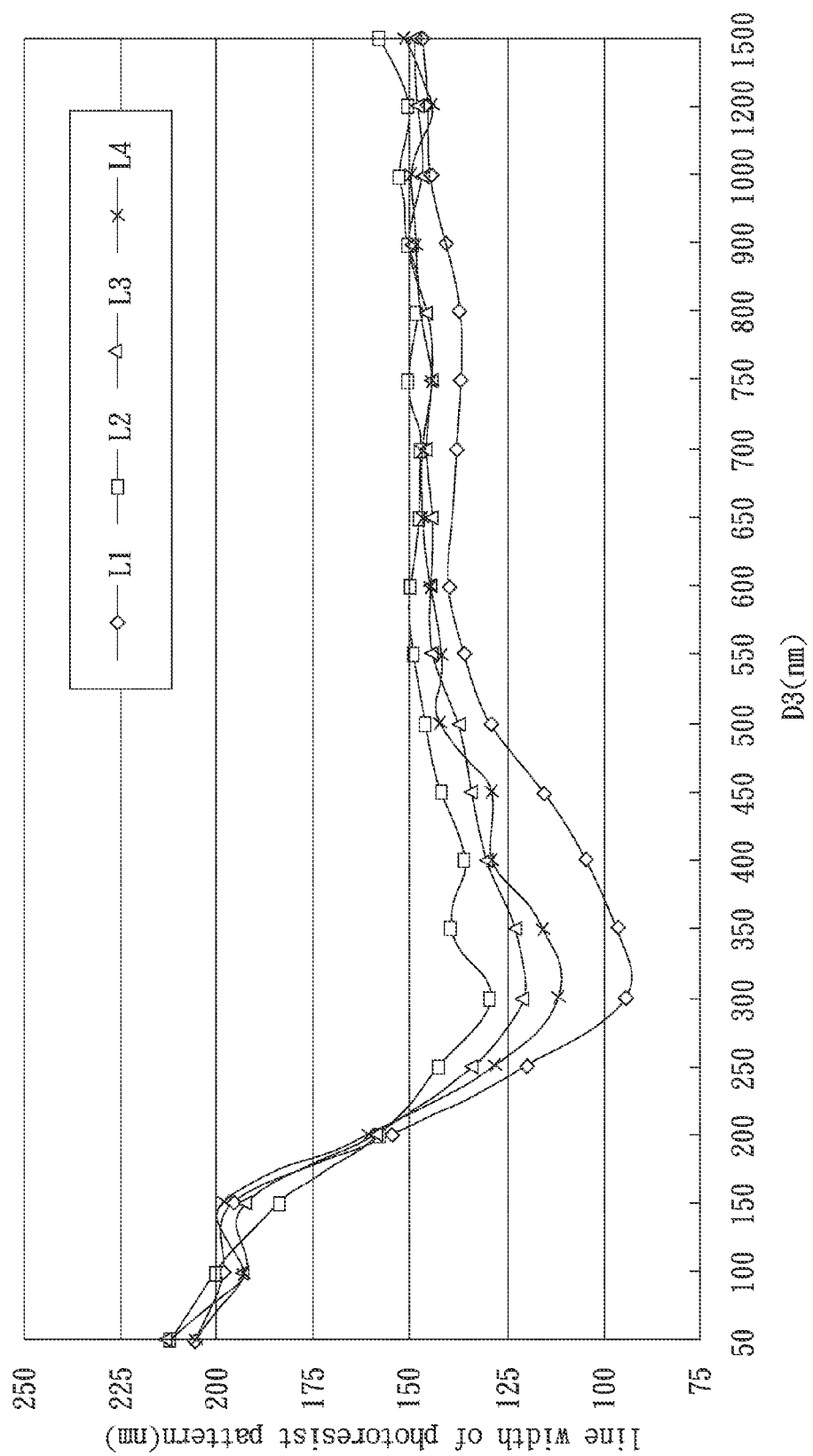
FIG. 2 shows a curve diagram obtained after performing experiments applied to multiple test layout patterns with different dimensions, in accordance with an embodiment of the present invention.

FIG. 2 shows a curve diagram obtained after carrying out experiments applied to multiple test layout patterns with different dimensions. As illustrated in FIG. 2, the horizontal axis represents the distance D3 between the photoresist covering region 130 and each of the active regions 110, the vertical axis represents the actual line width (corresponding to the D2 of the test layout pattern in FIG. 1) of developed photoresist pattern, and the wavelength of a light source used for exposure is chosen as about 193 nanometers (nm). It is understood that light sources with different wavelengths would demonstrate different curve diagrams. Moreover, for each of the test layout patterns 100 with different dimensions, the layout width D1 of each of the ion implant regions 120 is 600 nm, and the layout distance D2 between the two ion implant regions 120 is 170 nm. Curves L1, L2, L3 and L4 in FIG. 2 respectively depict experimental data in the situations of the length of each of the active regions 110 being 200 nm, 400 nm, 600 nm and 800 nm. Since the layout distance D2 between the two ion implant regions 120 in each of the test layout patterns 100 is 170 nm, the ideal line widths of developed photoresist patterns for the respective test patterns 100 all ought to be 170 nm. However, the line widths of the developed photoresist patterns practically do not meet target. Especially, when the layout length D4 of each of the active regions 110 is 800 nm and the layout distance D3 from the photoresist covering region 130 to each of the active regions 110 is 300 nm, the critical dimension variation of photoresist pattern is maximum.

As seen from the above-mentioned description that although optical proximity correction is employed in the above-mentioned experiment, the issue of variation between the actual critical dimension and the layout dimension of photoresist pattern still occurs. Accordingly, the present invention is directed to a novel method to compensate optical proximity correction for STI effect.

Figure 3:
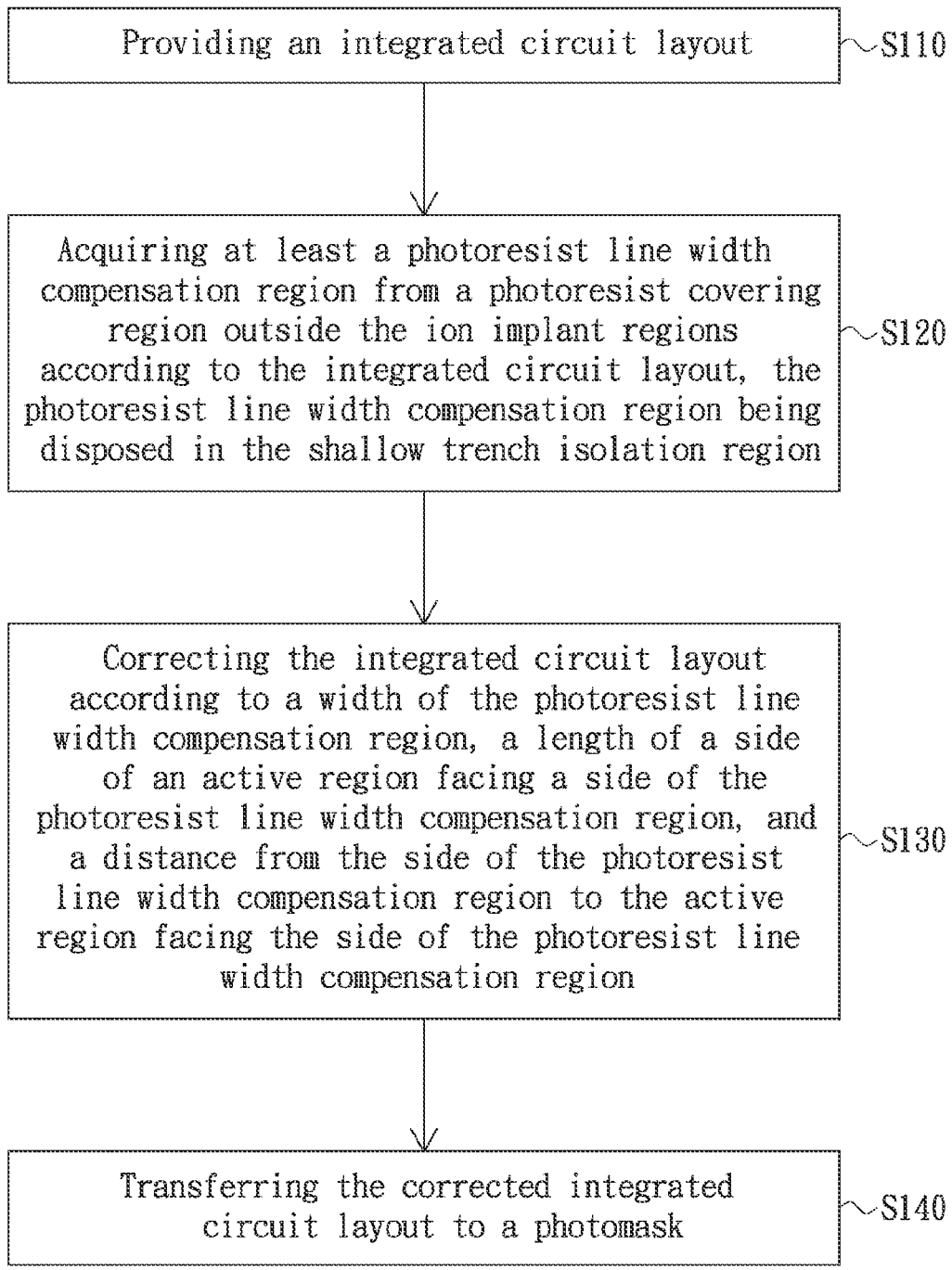
FIG. 3 shows a flowchart of a method to compensate optical proximity correction in accordance with an embodiment of the present invention.
Figure 4:
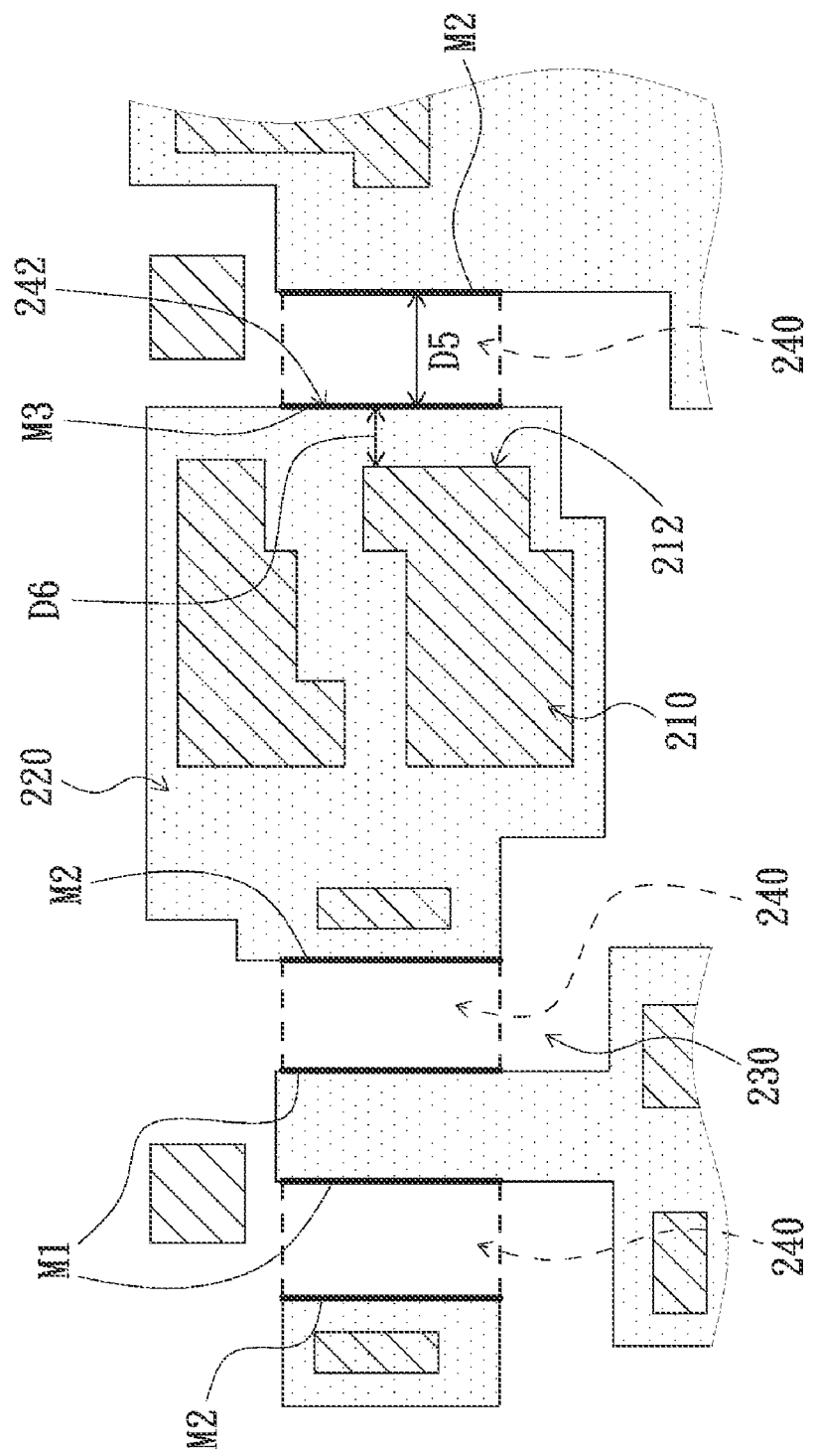
FIG. 4 shows a schematic view of an integrated circuit layout in accordance with an embodiment of the present invention.

FIG. 3 shows a flowchart of a method to compensate optical proximity correction in accordance with an embodiment of the present invention, and FIG. 4 shows a schematic view of an integrated circuit (IC) layout. As illustrated in FIGS. 3 and 4, the method to compensate optical proximity correction in accordance with the present embodiment is adapted for a photolithography process. In particular, the method to compensate optical proximity correction includes several steps which will be described below in detail.

Firstly, as illustrated by the step S110, an IC layout 200 is provided. The IC layout 200 includes a plurality of active regions 210, and a STI region 230. The STI region 230 is a region except the active regions 210. Moreover, the IC layout 200 further includes ion implant regions 220. The ion implant regions 220 are overlapped with a part of the STI region 230 and at least a part of the active regions 210. In a substrate, the active regions 210 and the STI region 230 are formed at a same layer and a region except the active regions 210 is the STI region 230. The ion implant regions 220 are defined by photoresists covering an implant layer on the substrate. Regions uncovered by the photoresists of the implant layer are the ion implant regions 220.

Subsequently, as illustrated by the step S120, at least one photoresist line width compensation region 240 is acquired from the photoresist covering region outside the ion implant regions 220 according to the IC layout 200 (FIG. 4 illustrates three photoresist line width compensation regions 240). An approach for acquiring the photoresist line width compensation region 240 for example includes acquiring a photoresist covering region in the STI region 230 as a photoresist line width compensation region 240. In one embodiment, the approach for acquiring the photoresist line width compensation region 240 can include acquiring a region in the photoresist covering region with a width smaller than 500 nm as the photoresist line width compensation region 240. Therefore, a width D5 of the photoresist line width compensation region 240 is, for example, smaller than 500 nm. That is, when the distance between two adjacent ion implant regions 220 is smaller than 500 nm, the line width of photoresist is needed to be compensated. In addition, the approach for acquiring the photoresist line width compensation region 240 can include acquiring a part of the photoresist covering region beside the ion implant region 220 having a width larger than 700 nm. Therefore, the width of the ion implant region 220 disposed beside the photoresist line width compensation region 240 is for example larger than 700 nm. That is, when the width of the ion implant region 220 is larger than 700 nm, the line width of the photoresist disposed at the side of the ion implant region 220 is needed to be compensated.

For the convenience of description, only one photoresist line width compensation region 240 is taken as an example to illustrate the following steps.

Afterwards, as illustrated by the step S130, after the photoresist line width compensation region 240 is acquired, the IC layout 200 is corrected according to a width D5 of the photoresist line width compensation region 240, a length of the side 212 of the active region 210 facing the side 242 of the photoresist line width compensation region 240, and a distance D6 from the side 242 of the photoresist line width compensation region 240 to the active region 210 facing the side 242.

More specifically, the step of correcting the IC layout 200 actually is the result of several sub-steps as follows. Firstly, a proper look-up table is selected from multiple look-up tables according to the length of the side 212 of the active region 210 facing the side 242 of the photoresist line width compensation region 240. For example, the look-up tables include a first look-up table, a second look-up table and a third look-up table. When the length of the side 212 of the active region 210 facing the side 242 (see the position indicated by line M1 in FIG. 4) of the corresponding photoresist line width compensation region 240 is smaller than 300 nm (containing the situation of the length equal to zero), the first look-up table is selected. Herein, the situation of the length of the side 212 of the active region 210 equal to zero represents that the side 242 of the photoresist line width compensation region 240 does not face the active region 210. The sides 242 indicated by the line M1 in FIG. 4 all do not face the respective active regions 210. Moreover, when the length of the side 212 (indicated by reference letter E1) of the active region 210 facing the side 242 (see the position indicated by line M2 in FIG. 4) of the corresponding photoresist line width compensation region 240 falls into the range from 300 nm to 600 nm, the second look-up table is selected. In addition, when the length of the side 212 (indicated by reference letter E2) of the active region 210 facing the side 242 (see the position indicated by line M3 in FIG. 4) of the corresponding photoresist line width compensation region 240 is larger than 600 nm, the third look-up table is selected.

An approaching for establishing the above-mentioned look-up tables is, for example firstly building up multiple test photomasks according to multiple test layout patterns with different dimensions, then using each of the test photomasks to form a photoresist pattern on a wafer, measuring an actual line width of the photoresist pattern and obtaining a difference between an ideal line width and the actual line width of the photoresist pattern. Subsequently, the look-up tables are established according to experimental data. The look-up tables each include correction values for the photoresist line width compensation regions 240 with different widths D5 and different distances D6 from the sides 242 to the respective active regions 210 facing the sides 242.

After that, the selected look-up table is inquired according to the width D5 of the photoresist line width compensation region 240 and the distance D6 between the side 242 of the photoresist line width compensation region 240 and the active region 210 facing the side 242, and thereby a correction value of the photoresist line width compensation regions 240 is obtained. Then the IC layout 200 is corrected according to the correction value of each of the photoresist line width compensation regions 240.

Finally, as illustrated by the step S140, the corrected IC layout is transferred to a photomask.

Since the method to compensate optical proximity correction in accordance with the present embodiment particularly compensates the line width of the photoresist pattern formed in the STI regions, the issue of photoresist pattern variation caused by the STI topography influence associated with the prior art can be relieved. Accordingly, the phenomenon of edges of the ion implant regions 220 being covered by photoresist or phothoresist peeling after developing can be suppressed, so that the practically finished IC can meet the design target.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method to compensate optical proximity correction, adapted for a photolithography process and comprising:
   providing an integrated circuit layout, wherein the integrated circuit layout comprises a plurality of active regions and a shallow trench isolation region, the shallow trench isolation region is a region except the active regions, and the integrated circuit layout further comprises a plurality of ion implant regions overlapped with the shallow trench isolation region and at least a part of the active regions;
   acquiring at least a photoresist line width compensation region from a photoresist covering region outside the ion implant regions according to the integrated circuit layout, wherein the photoresist line width compensation region each is disposed in the shallow trench isolation region;
   correcting the integrated circuit layout according to a width of the photoresist line width compensation region, a length of a side of the active region facing a side of the photoresist line width compensation region, and a distance between the side of the photoresist line width compensation region and the active region facing the side of the photoresist line width compensation region; and
   transferring the corrected integrated circuit layout to a photomask.

2. The method to compensate optical proximity correction as claimed in claim 1, wherein the width of the photoresist line width compensation region is smaller than 500 nm.

3. The method to compensate optical proximity correction as claimed in claim 1, wherein a width of the ion implant region disposed at the side of the photoresist line width compensation region is larger than 700 nm.

4. The method to compensate optical proximity correction as claimed in claim 1, wherein the step of correcting the integrated circuit layout comprises:
   selecting a proper look-up table from a plurality of look-up tables according to the length of the side of the active region facing the side of the photoresist line width compensation region;
   obtaining a correction value for the photoresist line width compensation region by inquiring the selected look-up table according to the width of the photoresist line width compensation region and the distance from the side of the photoresist line width compensation region to the active region facing the side of the photoresist line width compensation region; and
   correcting the integrated circuit layout according to the correction value.

5. The method to compensate optical proximity correction as claimed in claim 4, wherein the look-up tables comprise a first look-up table, a second look-up table and a third look-up table, the first look-up table is selected when the length of the side of the active region facing the side of the photoresist line width compensation region is smaller than 300 nm, the second look-up table is selected when the length of the side of the active region facing the side of the photoresist line width compensation region falls into the range from 300 nm to 600 nm, and the third look-up table is selected when the length of the side of the active region facing the side of the photoresist line width compensation region is larger than 600 nm.

* * * * *